US008531728B2

(12) United States Patent
Ochiai et al.

(10) Patent No.: US 8,531,728 B2
(45) Date of Patent: Sep. 10, 2013

(54) IMAGE PROCESSING APPARATUS AND METHOD

(75) Inventors: Takashi Ochiai, Machida (JP); Kaori Taya, Tokyo (JP); Takayuki Jinno, Kawasaki (JP); Yoshinori Shindo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 13/010,541

(22) Filed: Jan. 20, 2011

(65) Prior Publication Data

US 2011/0194760 A1 Aug. 11, 2011

(30) Foreign Application Priority Data

Feb. 10, 2010 (JP) ................................. 2010-028206

(51) Int. Cl.
*G06K 15/00* (2006.01)

(52) U.S. Cl.
USPC .......... 358/3.06; 358/504; 358/1.9; 358/1.15; 358/3.01

(58) Field of Classification Search
USPC ........................ 358/3.06, 504, 1.9, 1.15, 3.01
See application file for complete search history.

(56) References Cited

U.S. PATENT DOCUMENTS

| | | | |
|---|---|---|---|
| 6,874,864 B1 | 4/2005 | Maeda et al. | |
| 2005/0212854 A1* | 9/2005 | Akahira et al. | 347/44 |
| 2006/0077488 A1* | 4/2006 | Zhang et al. | 358/504 |
| 2006/0290987 A1* | 12/2006 | Yanai et al. | 358/3.01 |
| 2007/0243314 A1 | 10/2007 | Jinno | 427/8 |
| 2009/0268240 A1* | 10/2009 | Watanabe et al. | 358/1.15 |
| 2011/0019214 A1 | 1/2011 | Taya et al. | 358/1.9 |

FOREIGN PATENT DOCUMENTS

| | | |
|---|---|---|
| JP | 2002-96455 | 4/2002 |
| JP | 2002-307755 | 10/2002 |

OTHER PUBLICATIONS

U.S. Appl. No. 13/040,100, filed Mar. 3, 2011 by Takayuki Jinno.

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

In generating image data for use in image formation by multi-pass recording, the position of a pixel of interest to be color separated relative to a recording region corresponding to the conveyance distance of a recording medium in one pass of the multi-pass recording is determined, a color separation table corresponding to the result of the determination is selected, and image data of the pixel of interest is color separated using the selected color separation table.

12 Claims, 16 Drawing Sheets

IMAGE PROCESSING APPARATUS AND METHOD

BACKGROUND OF THE INVENTION

1. Field of the Invention

The present invention relates to image processing for generating image data for use in image formation by multi-pass recording.

2. Description of the Related Art

In multi-pass recording, a recording medium is conveyed in the interval between successive recording scanning operations, thus ink droplets are supplied onto the recording medium at a predetermined time interval. Hence, an image can be recorded even on a recording medium such as plain paper which absorbs ink at a relatively slow rate while gradually drying the supplied ink droplets, thereby obtaining a satisfactorily result upon fixing. Also, in the multi-pass recording, different nozzles are used to record the same image region for each recording scanning operation upon conveying the recording medium. Hence, even if the individual nozzles have a variation in ink discharge amount between them, the variation in discharge amount can be canceled and made inconspicuous on the image. Further, heterogeneity of density (so-called white streaks and black streaks) is often generated due to a variation in amount of conveyance of the recording medium in the interval between successive recording scanning operations, but can be made inconspicuous by the multi-pass recording.

Note that a variation in discharge amount between the individual nozzles and that in amount of conveyance of the recording medium lead to image deterioration, which are unavoidable due to factors associated with the manufacturing process and component accuracy. Therefore, the multi-pass recording is an important technique in maintaining a given image quality in a serial inkjet recording apparatus.

The recording rate in each pass of the multi-pass recording by an inkjet recording apparatus is given by 1/(the number of passes). That is, in four-pass recording, each pass has the same recording rate of 25%. However, the invention disclosed in Japanese Patent Laid-Open No. 2002-096455 changes the recording rate in each pass in accordance with the positions of recording elements (nozzles). This reduces image deterioration such as so-called “color heterogeneity” generated due to the difference in the applying order of different inks, and heterogeneity of density due to so-called “end dot deflection” in which the ink-landing positions of liquid droplets discharged by nozzles in the end portions of a nozzle array shift more significantly than those of liquid droplets discharged by nozzles in its middle portion.

FIG. 1 illustrates an example of the relationship between nozzles and the recording rate in the four-pass recording. Referring to FIG. 1, the axis of abscissas indicates the nozzle number (the numbers 0, 1, 2, . . . assigned to nozzles in turn from the end of a nozzle array in the sub-scanning direction), and the axis of ordinates indicates the recording rate. The recording rates in the end portions of the nozzle array are less than 25%, that in the middle portion of the nozzle array is more than 25%, and the average recording rate is 25%, as shown in FIG. 1. That is, the recording rate is higher in the middle portion of the nozzle array than in its end portions, so the end dot deflection is reduced and image deterioration, in turn, is reduced.

On the other hand, dye inks formed using dyes which easily dissolve in water as color materials are widely employed as inks for an ink jet recording apparatus. In a dye ink containing water as its major component, the color material dissolved in a solvent easily penetrates into the fibers of a recording medium. Hence, even after image recording, the surface shape of the recording medium is easily maintained, so a gloss of the recording medium itself is maintained intact as that of an image. In other words, an image with an excellent gloss can be easily obtained upon recording an image on a recording medium with an excellent gloss using dye inks. Hence, an inkjet recording apparatus which employs dye inks can adjust the glossiness of an image by adjusting the glossiness of a recording medium.

A dye ink generally has low lightfastness, so dye molecules of the color material photo-decompose and the formed image fades. Also, a printing product printed by a dye ink generally has low water resistance, so dye molecules penetrated into fibrous materials dissolve in water as it gets wet, and a smear is generated in the formed image.

To solve problems associated with the lightfastness and water resistance, which are encountered when dye inks are used, development of pigment inks formed using pigments as color materials is in progress in recent years. A pigment ink contains particles of a pigment with sizes of several tens of nanometers to several micrometers in a solvent, unlike a dye ink which contains molecules of a dye. Color material particles of a pigment ink are larger than those of a dye ink, so a printing product with high lightfastness and water resistance can be obtained using the former ink.

The color material of a pigment ink is hard to penetrate into a recording medium, and therefore deposits on the surface of the recording medium. Thus, the microscopic shape of the image surface differs between a region to which a pigment ink is applied and that to which no pigment ink is applied. Also, the amount of color material used differs depending on the image density and color. Accordingly, the area across which the color material covers the recording medium differs in that case, and the reflectance of the color material and the surface reflectance of the recording medium are different from each other, so a difference occurs in glossiness depending on the difference in area across which the color material covers the recording medium.

For the above-mentioned reason, when an image is recorded using a pigment ink, the sense of glossiness differs depending on the image density and color. Also, even if the image density and color are the same, regions with different glossinesses appear in a band shape with a width corresponding to the conveyance distance of a recording medium, as will be described in more detail later. The state in which regions with different glossinesses are mixed in the same image, as described above, will be referred to as “heterogeneity of glossiness”, and heterogeneity of glossiness appearing in a band shape will be referred to as “band-shaped heterogeneity of glossiness” hereinafter. When this occurs, a gloss region in which a gloss is observed and a matte region in which no gloss is observed are mixed in the same image, and one recognizes this image as an unsatisfactory image especially when it is a photographic image.

To suppress the heterogeneity of glossiness, a method of using ink (to be referred to as clear ink hereinafter) that is substantially transparent and colorless and therefore does not influence color reproduction has been known. That is, the heterogeneity of glossiness is suppressed by applying clear ink or white ink to a region which is covered with no color ink (for example, Japanese Patent Laid-Open No. 2002-307755). The inventors of the present invention conducted a close examination, and found out that the technique disclosed in Japanese Patent Laid-Open No. 2002-307755 is effective for heterogeneity of glossiness generated due to the difference in density or color, but is ineffective in reducing band-shaped heterogeneity of glossiness generated even when the image density and color are the same.

When multi-pass recording is performed at a recording rate which differs for each recording scanning operation, band-shaped heterogeneity of glossiness appears for each conveyance width (each conveyance distance in the sub-scanning direction) of recording paper per recording scanning operation. The band-shaped heterogeneity of glossiness will be described with reference to FIG. 2. A recording region on a recording medium is divided for each conveyance width, and the obtained recording regions are defined as a first recording region, second recording region, and third recording region in turn in the sub-scanning direction, as shown in FIG. 2. The glossiness changes from the upper end to the lower end in each recording region, and a large difference in glossiness occurs between the ends of adjacent recording regions (for example, the lower end of the first recording region and the upper end of the second recording region) and is recognized as band-shaped heterogeneity of glossiness.

The cause of the difference in glossiness between the upper and lower ends of each recording region will be explained with reference to schematic views shown in FIGS. 3A and 3B. When two liquid droplets to be superimposed on each other upon landing are discharged in the same pass, the second liquid droplet lands and is superimposed on the first liquid droplet, before the first liquid droplet sufficiently dries, so these two liquid droplets merge into one liquid droplet (FIG. 3A). However, when two liquid droplets to be superimposed on each other upon landing are discharged in different passes, the second liquid droplet lands after the first liquid droplet dries, so these two liquid droplets do not merge into one liquid droplet (FIG. 3B). As a result, the surface of a dot formed by liquid droplets superimposed on each other in the same pass becomes smooth (has high glossiness), while that of a dot formed by liquid droplets superimposed on each other in different passes becomes rough (has low glossiness).

The states of the surfaces of the upper and lower ends of a recording region in four-pass recording will be described with reference to schematic views shown in FIGS. 4A and 4B. Note that the nozzle recording rate in each pass is the same as that shown in FIG. 1.

The recording rate at the upper end is 26% in the first pass, 32% in the second pass, 26% in the third pass, and 16% in the fourth pass, and this means that the amount of ink recording (58%) in the first half pass is larger than that (42%) in the second half pass. On the other hand, the recording rate at the lower end is 16% in the first pass, 26% in the second pass, 32% in the third pass, and 26% in the fourth pass, and this means that the amount of ink recording (42%) in the first half pass is smaller than that (58%) in the second half pass. At the lower end at which the amount of ink recording in the second half pass is relatively large, dots with a relatively small amount of ink recording are covered with those with a relatively large amount of ink recording, so the surface has its uneven shape lessened and has high glossiness (FIG. 4B). Conversely, at the upper end at which the amount of ink recording in the second half pass is relatively small, dots having a relatively small amount of ink recording are formed (dots are sparsely formed) on those which are formed first and have a relatively large amount of ink recording, so the surface has its uneven shape enhanced and has low glossiness (FIG. 4A). In this manner, a difference in glossiness occurs between the upper and lower ends of the recording region, thus generating band-shaped heterogeneity of glossiness.

SUMMARY OF THE INVENTION

In one aspect, an image processing apparatus for generating image data for use in image formation by multi-pass recording, comprising: a determiner, configured to determine a position of a pixel of interest to be color separated relative to a recording region corresponding to a conveyance distance of a recording medium in one pass of the multi-pass recording; a selector, configured to select a color separation table corresponding to a result of the determination; and a color separator, configured to color separate image data of the pixel of interest using the selected color separation table.

According to the aspect, it is possible to suppress the occurrence of band-shaped heterogeneity of glossiness upon image formation by multi-pass recording.

Further features of the present invention will become apparent from the following description of exemplary embodiments with reference to the attached drawings.

DESCRIPTION OF THE EMBODIMENTS

Image processing in embodiments according to the present invention will be described in detail below with reference to the accompanying drawings. Note that ink with a relatively high density will be referred to as "dark ink" and ink with a relatively low density will be referred to as "light ink" hereinafter. Also, a dot formed by a relatively large ink droplet will be referred to as a "large dot", and a dot formed by a relatively small ink droplet will be referred to as a "small dot" hereinafter. Moreover, colored ink containing a color material will be referred to as "color ink", and ink containing no color material or a colorless color material will be referred to as "clear ink" hereinafter.

First Embodiment

A method of reducing band-shaped heterogeneity of glossiness using large and small dots will be described in the first embodiment.

[Apparatus Configuration]

Figure 5:
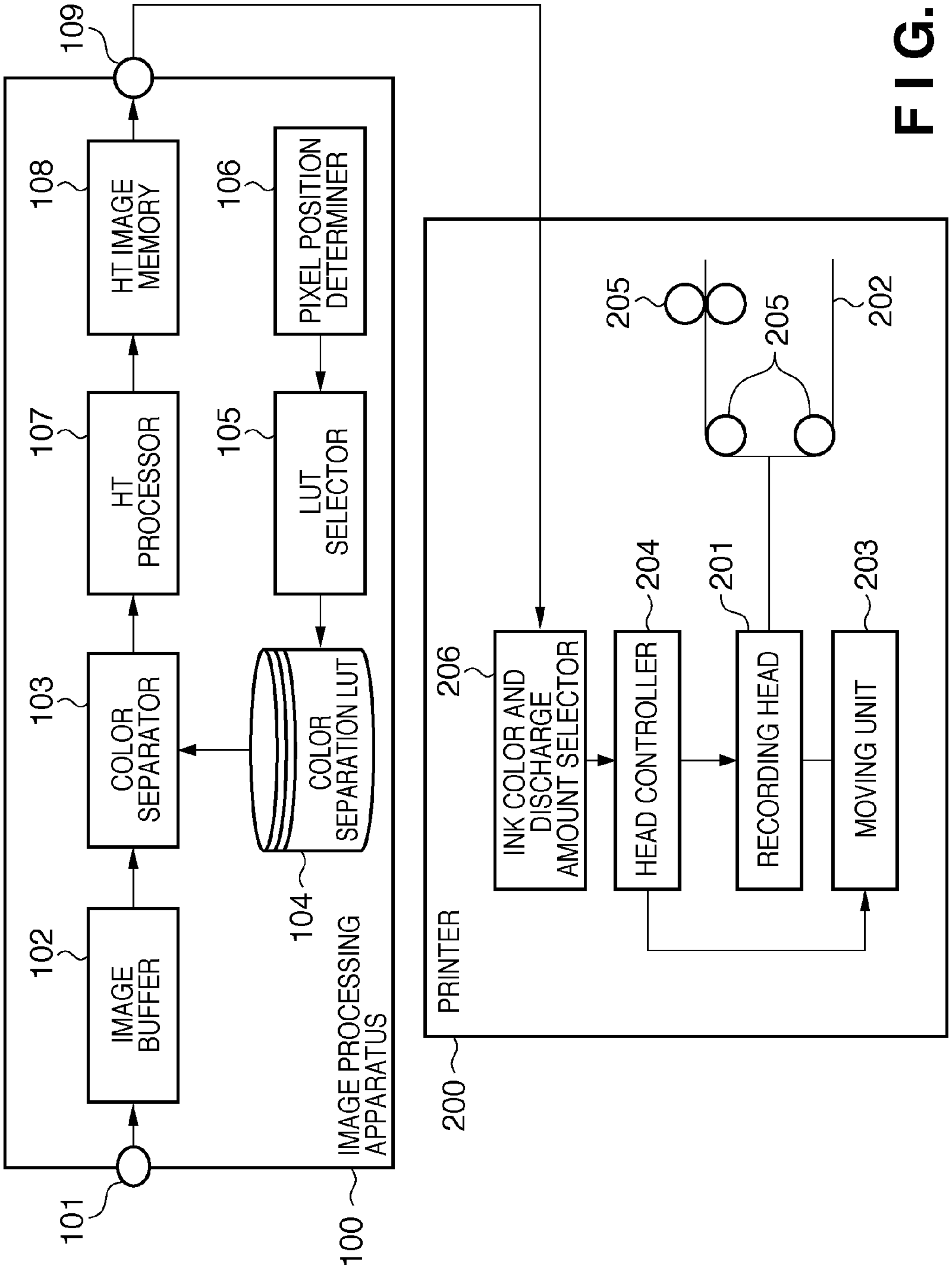
FIG. 5 is a block diagram for explaining the configuration of an image processing apparatus in the first embodiment.

The configuration of an image processing apparatus in the first embodiment will be described with reference to a block diagram shown in FIG. 5. An image processing apparatus 100 can be implemented by installing a printer driver on a computer apparatus. In this case, each configuration of the image processing apparatus 100 is implemented by executing a program of the printer driver by the computer apparatus. An image processing apparatus 100 implemented by hardware or software can also be built into a printer 200.

The image processing apparatus 100 generates image data for use in image formation by multi-pass recording. An image buffer 102 is a memory for storing image data which is to be printed and is input via an input unit 101 such as a USB (Universal Serial Bus) interface. A color separator 103 looks up a color separation lookup table (LUT) 104 to color separate the image data stored in the image buffer 102 into recording data corresponding to ink colors provided in the printer 200. A LUT selector 105 selects a color separation LUT to be looked up by the color separator 103, as will be described in more detail later. In other words, the color separator 103 looks up the color separation LUT selected by the LUT selector 105 to execute color separation. A halftone (HT) processor 107 performs halftone processing of the recording data which has multiple gray levels per color and is output from the color separator 103 to convert it into recording data with binary values per color. An HT image memory 108 stores the recording data with binary values per color. The recording data which has binary values per color and is stored in the HT image memory 108 is output to the printer 200 via an output unit 109 such as a USB interface.

A pixel position determiner 106 determines whether a pixel to undergo color separation (pixel of interest) is at, for example, a position closer to the upper end (on the upper end side) or the lower end (on the lower end side) of a recording region (to be referred to as a band hereinafter) corresponding to the conveyance distance or a recording medium in one pass. The LUT selector 105 selects a color separation LUT such that the amount of large dots used is larger at a position closer to the upper end of the band than at a position closer to its lower end, in accordance with the determination result obtained by the pixel position determiner 106.

The printer 200 forms an image on a recording medium by multi-pass recording. An ink color and discharge amount selector 206 selects an ink color and discharge amount from the ink colors provided in a recording head 201 and the ink discharge amounts by which the recording head 201 can discharge inks, in accordance with the value of the recording data with binary values per color. The selected ink color and discharge amount are output to a head controller 204.

The head controller 204 controls movement of the recording head 201 via a moving unit 203 to control ink discharge by the recording head 201, based on the selected ink color and discharge amount. That is, the head controller 204 two-dimensionally moves the recording head 201 relative to a recording medium 202 conveyed by a conveyor 205 to form an image on the recording medium 202.

[Recording Head]

The arrangement of the recording head 201 will be described with reference to FIG. 6. The recording head 201 discharges pigment inks of four colors: cyan C, magenta M, yellow Y, and black K. Further, the recording head 201 includes nozzles with different ink droplet sizes (discharge amounts) for each color, each nozzle on a nozzle array 301 discharges ink droplets which form large dots, and each nozzle on a nozzle array 302 discharges ink droplets which form small dots. That is, the recording head 201 can discharge ink droplets with different discharge amounts to form two types of dots with different sizes, for each of four color materials.

Figure 6:
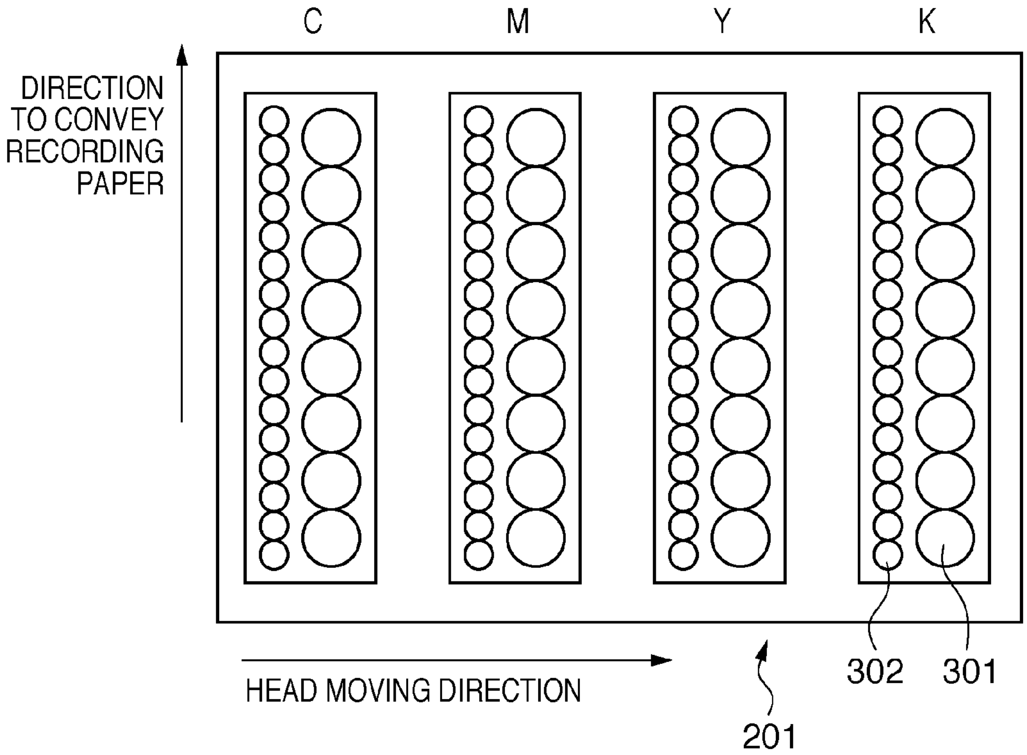
FIG. 6 is a view for explaining the arrangement of a recording head.

Note that FIG. 6 shows the recording head 201 having a layout in which nozzles with each color and each ink droplet size align themselves in the direction to convey recording paper, for the sake of descriptive simplicity. However, the nozzle layout is not limited to this. For example, a plurality of nozzle arrays with each ink droplet size may be used or nozzles on each nozzle array may be arranged in a zigzag pattern. Also, although FIG. 6 shows a layout in which nozzle groups which discharge inks of respective colors are juxtaposed in the head moving direction, they may be juxtaposed in the direction to convey recording paper. Moreover, although two, large and small ink droplet sizes will be exemplified hereinafter, three, large, middle, and small, or more ink droplet sizes may be used.

Figure 4A:
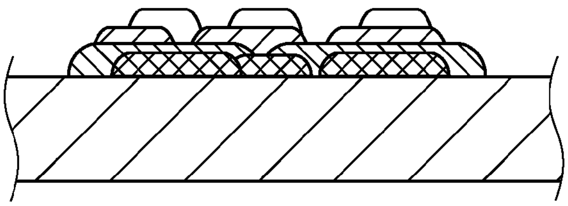
FIGS. 4A and 4B are schematic views for explaining the states of the surfaces of the upper and lower ends of a recording region in four-pass recording.

In reproducing the same density using large and small dots, large dots can be fewer to reproduce this density. Hence, the use of large dots makes it possible to lessen the uneven shape of the surface of a recording medium, thereby increasing the glossiness. As mentioned earlier, at the upper end at which the amount of ink recording is relatively small, dots having a relatively small amount of ink recording are sparsely formed on those which are formed first and have a relatively large amount of ink recording, so the surface has its uneven shape enhanced and has its glossiness decreased (see FIG. 4A). In view of this, increasing the amount of large dots used at a position closer to the upper end makes it possible to lessen the uneven shape, thereby suppressing a decrease in glossiness. This, in turn, makes it possible to reduce the difference in glossiness between the upper and lower ends of the band, thereby suppressing the occurrence of band-shaped heterogeneity of glossiness.

[Operation of Image Processing Apparatus]

The operation of the image processing apparatus will be described with reference to a flowchart shown in FIG. 7.

First, RGB image data input by the input unit 101 is stored in a predetermined region of the image buffer 102 (S101). Next, the pixel position determiner 106 determines the position of a pixel to undergo color separation (pixel of interest) within a band (S102). Based on the determination result obtained by the pixel position determiner 106, the LUT selector 105 selects one of color separation LUTs held in the color separation lookup table 104 (S103).

Figure 8:
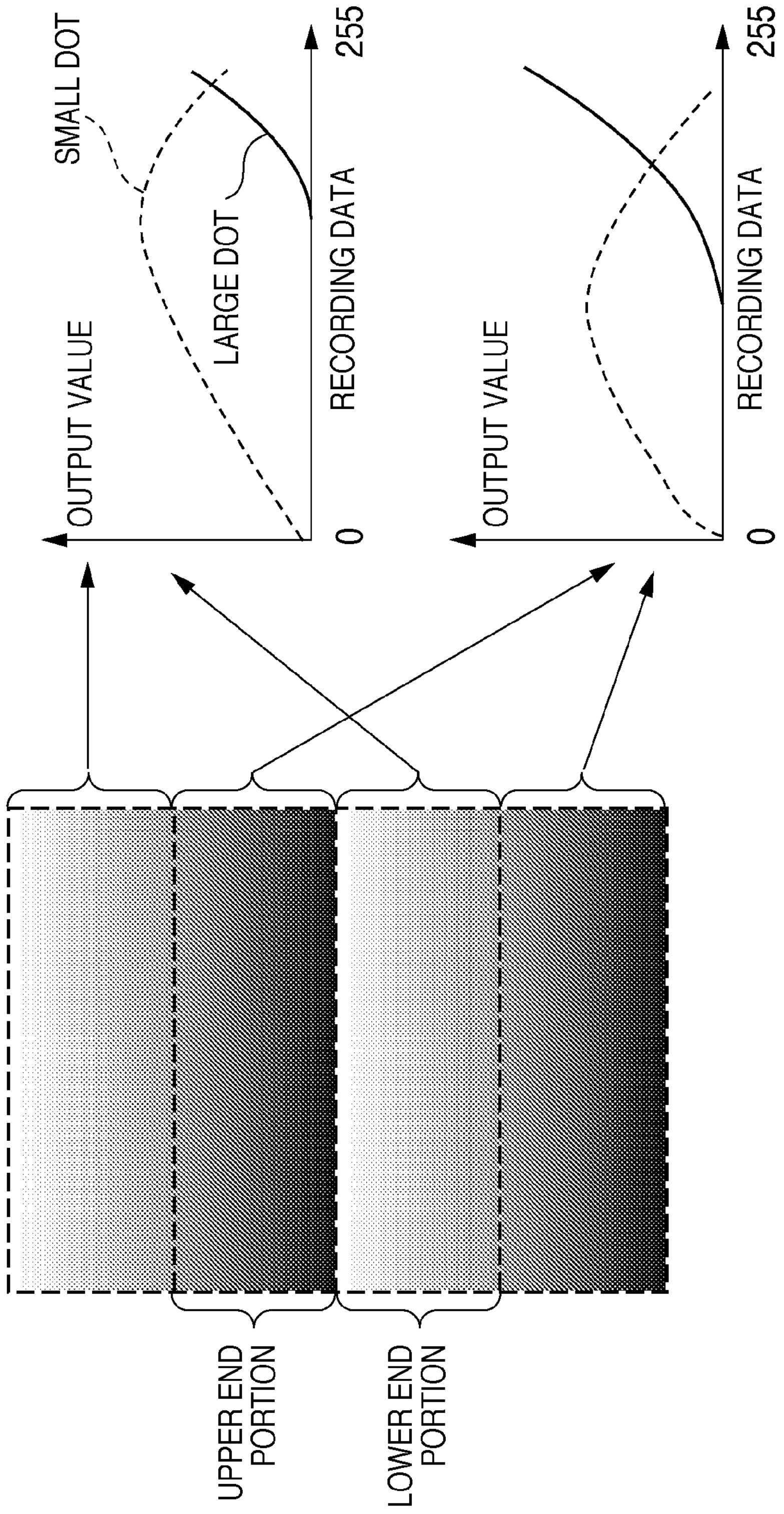
FIG. 8 is a view for explaining a method of selecting a color separation LUT.

A method of selecting a color separation LUT will be described with reference to FIG. 8. The LUT selector 105 selects a color separation LUT, according to which small dots are frequently used, if the pixel of interest falls within the range of the lower end of the band to its middle (lower end portion), and selects a color separation LUT, according to which large dots are frequently used, if the pixel of interest falls within the range of the middle of the band to its upper end (upper end portion).

The color separator 103 looks up the color separation LUT selected by the LUT selector 105 to convert the image data of the pixel of interest into recording data (S104). The color separator 103 color separates the RGB image data of the pixel of interest into CMYK data, and separates it into planes of large and small dots to be formed by ink droplets with different sizes (discharge amounts) for each ink color. That is, the recording head 201 discharges ink droplets with two, large and small sizes for each of four color inks. Thus, the RGB image data is converted into recording data of eight planes in which C, M, Y, and K planes are combined with those ink droplet sizes.

The processes in steps S102 to S104 are repeated until it is determined in step S105 that the color separation of the RGB image data stored in the image buffer 102 is complete. Note that the recording data obtained after the color separation is stored in a predetermined region of the image buffer 102.

The HT processor 107 performs pixel position selection processing for halftone processing (S106), performs halftone processing which decreases the number of gray levels of the recording data (S107), and stores, in the HT image memory 108, the recording data obtained after the number of gray levels is decreased (S108). For example, recording data with eight bits in each plane is converted into recording data with binary values in each plane. Note that the HT processor 107 employs, for example, an error diffusion method for halftone processing.

The processes in steps S106 to S108 are repeated until it is determined in step S109 that the halftone processing of the recording data stored in the image buffer 102 is complete. After the end of the halftone processing, the output unit 109 outputs the recording data stored in the HT image memory 108 to the printer 200 as an output dot pattern (S110).

Upon receiving the recording data input from the image processing apparatus 100, the printer 200 selects an ink color and discharge amount in accordance with the recording data, and forms an image. The printer 200, for example, drives each nozzle at a predetermined interval while moving the recording head 201 from the left to the right relative to the recording medium to discharge ink droplets, thereby recording dots on the recording medium. After the end of one recording scanning operation, the recording head 201 is returned to the left end, and the recording medium 202 is conveyed by a predetermined amount at the same time. The printer 200 repeats the foregoing processes to form an image represented by the recording data.

Color Separator

Figure 9:
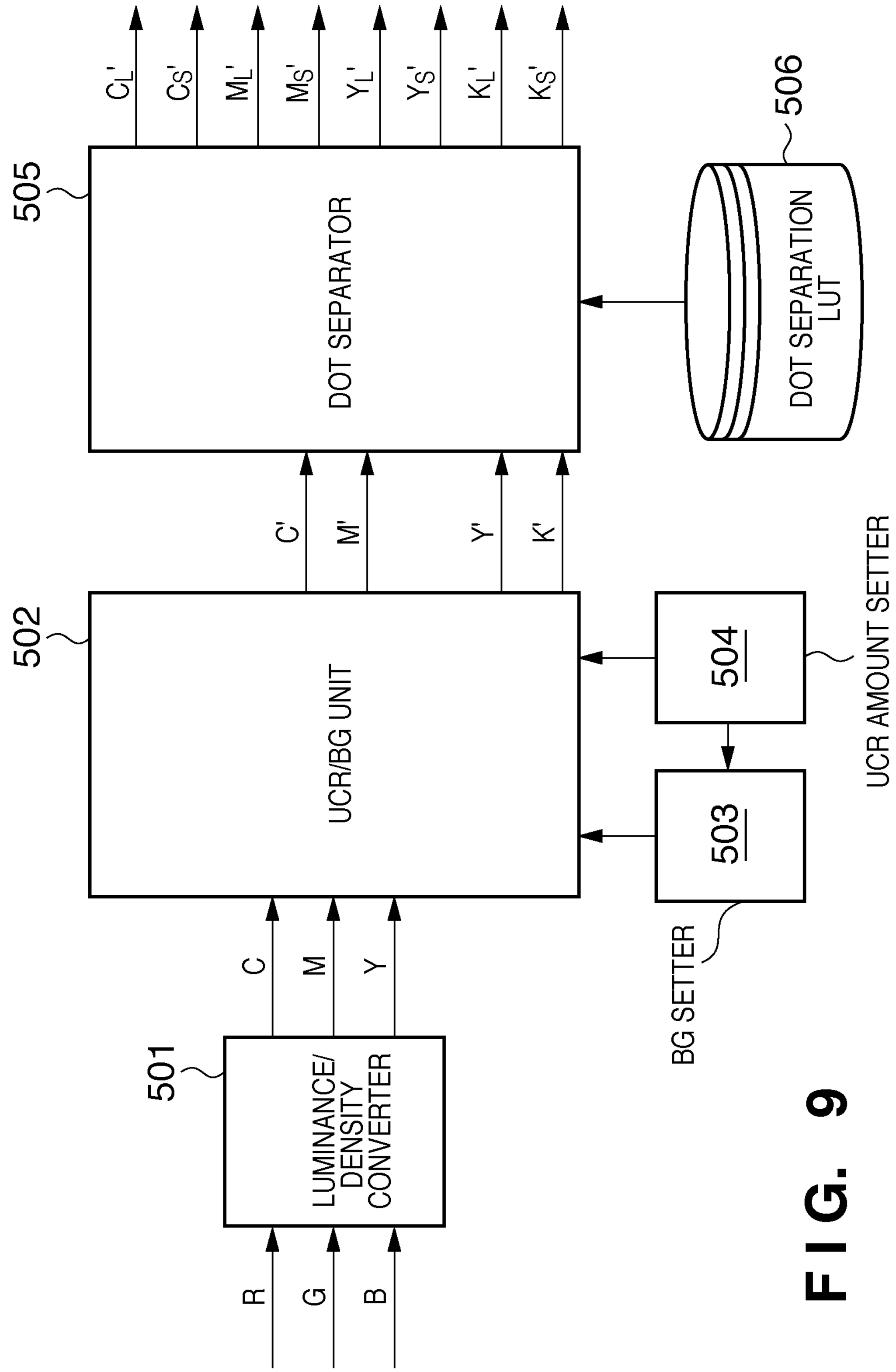
FIG. 9 is a block diagram for explaining the detailed configuration of a color separator.

The detailed configuration of the color separator 103 will be described with reference to a block diagram shown in FIG. 9. A luminance/density converter 501 converts RGB image data with eight bits per color into CMY image data by logarithmic transformation as:

$$C=-\alpha\log(R/255)$$

$$M=-\alpha\log(G/255)$$

$$Y=-\alpha\log(B/255) \quad (1)$$

where $\alpha$ is an arbitrary real number.

An under color removal/black generation (UCR/BG) unit 502 converts the CMY data into CMYK data using β(Min(C, M, Y), μ) (note that β(Min(C, M, Y), μ) is a real number which depends on Min(C, M, Y) and μ, and a method of using K ink can be set using β) set by a BG setter 503 and the value μ set by a UCR amount setter 504 in accordance with:

$$C'=C-(\mu/100)\times\mathrm{Min}(C,M,Y)$$

$$M'=M-(\mu/100)\times\mathrm{Min}(C,M,Y)$$

$$Y'=Y-(\mu/100)\times\mathrm{Min}(C,M,Y)$$

$$K'=\beta(\mathrm{Min}(C,M,Y),\mu)\times(\mu/100)\times\mathrm{Min}(C,M,Y) \quad (2)$$

where Min( ) is a function which finds a minimum value.

A dot separator 505 looks up a dot separation LUT 506 (note that the dot separation LUT 506 is one of LUTs held in the color separation lookup table 104) to perform dot separation processing as:

$$C_L'=f_{CL}(C')$$

$$C_S'=f_{CS}(C')$$

$$M_L'=f_{ML}(M')$$

$$M_S'=f_{MS}(M')$$

$$Y_L'=f_{YL}(Y')$$

$$Y_S'=f_{YS}(Y')$$

$$K_L'=f_{KL}(K')$$

$$K_S'=f_{KS}(K') \quad (3)$$

where $f_{XL}$ and $f_{XS}$ are the dot separation functions for the X color (corresponding to the dot separation LUT 506), $X_L'$ is the recording data of a large dot in the X color after dot separation, and $X_S'$ is the recording data of a small dot in the X color after dot separation.

Dot Separation Function

The dot separation functions $f_{XL}$ and $f_{XS}$ will be described next by taking only the configurations of the functions $f_{CL}$ and $f_{CS}$ for cyan as an example. Functions for other colors can be formed in the same way.

Figure 10:
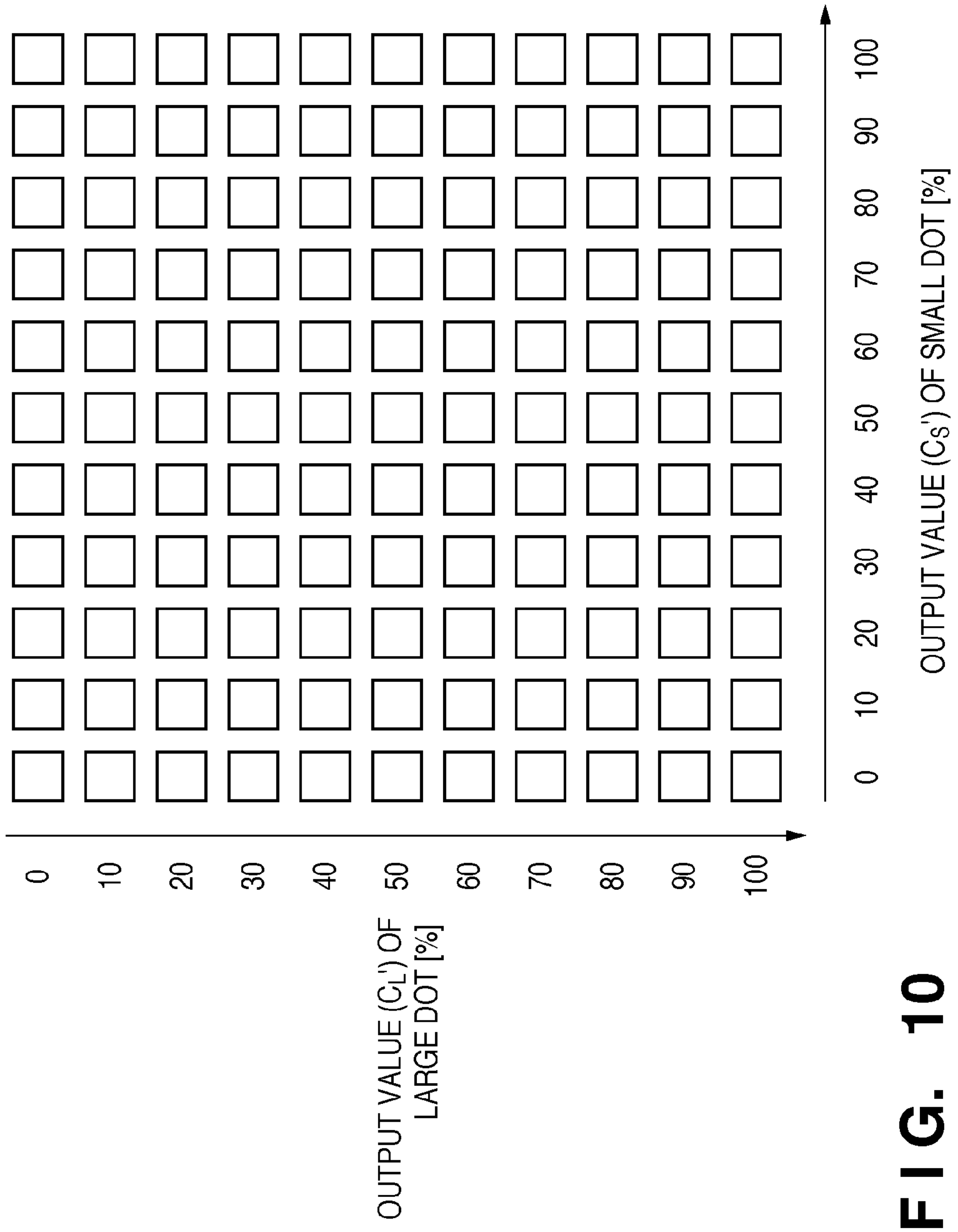
FIG. 10 is a chart for explaining an example of the configuration of a combined chart used to decide the amount of large dots used.

An example of the configuration of a combined chart used to decide the amount of large dots used will be described with reference to FIG. 10. The combined chart includes a plurality of patches formed by defining the output value $C_S'$ (0% to 100%) of a small dot in cyan on the abscissa, and the output value $C_L'$ (0% to 100%) of a large dot in cyan on the ordinate. That is, each patch included in the combined chart is formed by the printer 200 using recording data obtained by combining a certain output value $C_L'$ of a large dot and a certain output value $C_S'$ of a small dot. Note that the combined chart is formed using the number of passes and the recording rate, which are set in the upper end portion of the band.

An example of the configuration of a sample chart will be described with reference to FIG. 11. The sample chart includes a plurality of patches formed by defining the output value C' (0% to 100%) for cyan on the abscissa. That is, each patch included in the sample chart is formed by the printer 200 using recording data obtained by changing the output value C' for cyan. Note that the sample chart is formed using the number of passes, the recording rate, and a small dot, which are set in the lower end portion of the band.

Upon measuring the density (color) and glossiness of each patch in the combined chart, a plurality of patches which have nearly the same density measurement values but have different glossinesses are detected because large and small dots have different glossinesses. In view of this, a patch with density and glossiness measurement values closest to those of each patch in the sample chart is selected from the combined chart. The output value $C_L'$ of a large dot and the output value $C_S'$ of a small dot in the selected patch are decided as the output values of large and small dots corresponding to the output value C' for cyan, which are used in the upper end portion.

For example, when measurement values corresponding to output values $C_S'$=20% and $C_L'$=30% in the combined chart are closest to those in a patch with an output value C'=50% in the sample chart, dot separation functions are set as:

$$\begin{aligned} \text{For Lower End Portion: } f_{CL}(C') &= 0 \\ f_{CS}(C') &= C' \\ \text{For Upper End Portion: } f_{CL}(C') &= 30/50 \times C' \\ &= 0.6C' \\ f_{CS}(C') &= 20/50 \times C' \\ &= 0.4C' \end{aligned}$$

Dot separation functions can be formed by repeating the above-mentioned procedure for each patch in the sample chart.

In this manner, if the pixel of interest is in the lower end portion (on the lower end side) of the recording region, a color separation table used to form dots by frequently using recording elements which discharge ink droplets with a small size is selected. However, if the pixel of interest is in the upper end portion (on the upper end side) of the recording region, a color separation table used to form dots by frequently using recording elements which discharge ink droplets with a large size is selected. As a result, color separation is performed so as to use large dots more frequently on the upper end side of the band than on its lower end side, thereby making it possible to suppress the occurrence of band-shaped heterogeneity of glossiness.

Second Embodiment

Image processing in the second embodiment according to the present invention will be described below. The same reference numerals as in the first embodiment denote the same configurations in the second embodiment, and a detailed description thereof will not be given.

A method of reducing band-shaped heterogeneity of glossiness using dark and light inks will be described in the second embodiment.

[Recording Head]

Figure 12:
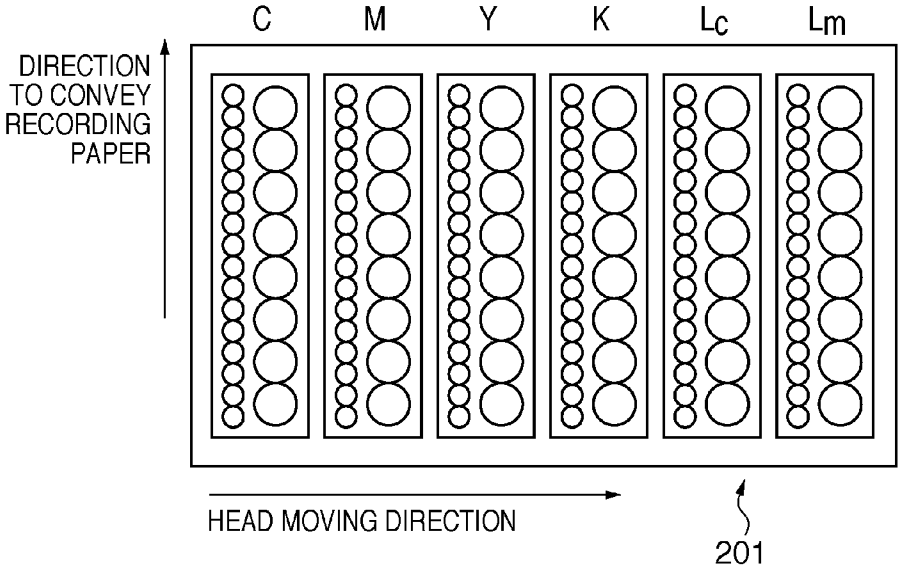
FIG. 12 is a view for explaining the arrangement of a recording head in the second embodiment.

The configuration of a recording head 201 in the second embodiment will be described with reference to FIG. 12. The recording head 201 in the second embodiment discharges pigment inks of six colors: cyan C, magenta M, yellow Y, black K, light cyan Lc, and light magenta Lm. Also, the recording head 201 includes nozzles with different ink droplet sizes (discharge amounts) for each color, and discharges ink droplets which form large dots and those which form small dots, as in the first embodiment. However, the recording head 201 may discharge ink droplets which form only small dots or large dots.

[Operation of Image Processing Apparatus]

Figure 7:
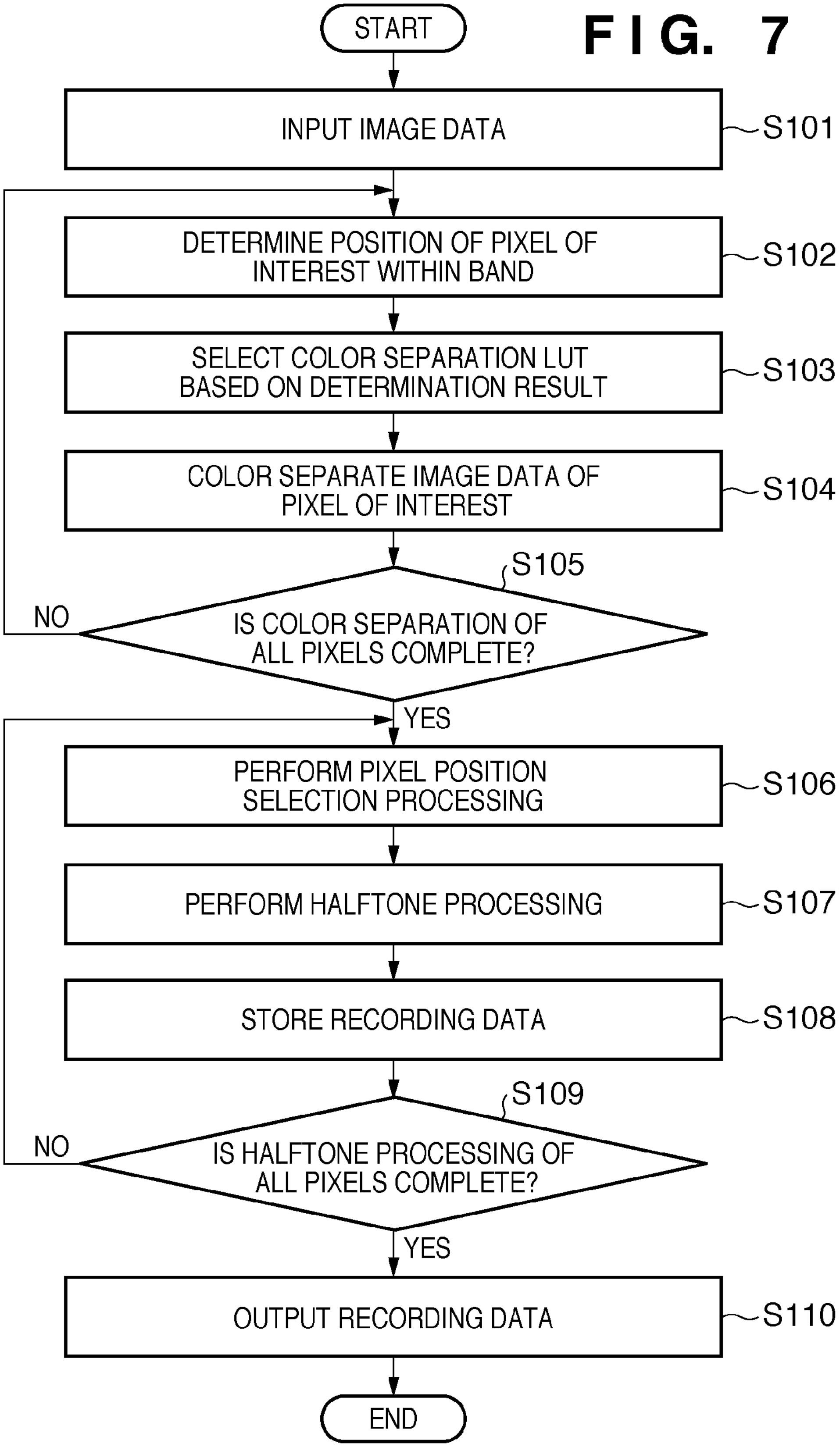
FIG. 7 is a flowchart for explaining the operation of the image processing apparatus.

The operation of an image processing apparatus in the second embodiment is the same as in the first embodiment except for steps S103 and S104 in FIG. 7. Based on the determination result obtained by a pixel position determiner 106, a LUT selector 105 selects one of color separation LUTs held in a color separation lookup table 104 (S103).

Figure 13:
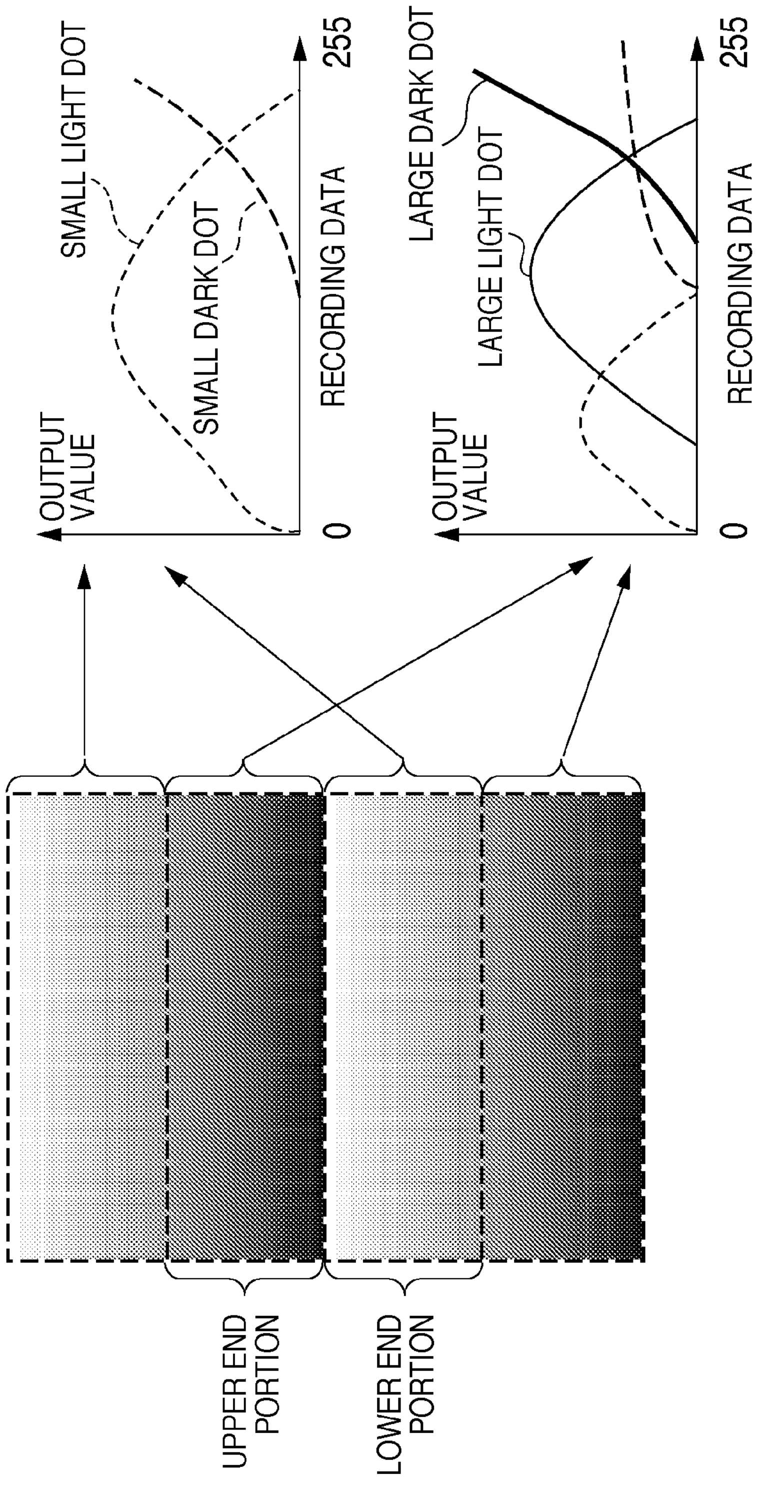
FIG. 13 is a view for explaining a method of selecting a color separation LUT.

A method of selecting a color separation LUT will be described with reference to FIG. 13. If the pixel of interest is in the lower end portion of the band, the LUT selector 105 selects a color separation LUT according to which small dots of dark ink (to be referred to as small dark dots hereinafter) or dark ink is frequently used. However, if the pixel of interest is in the upper end portion of the band, the LUT selector 105 selects a color separation LUT according to which large dots of light ink (to be referred to as large light dots hereinafter) or light ink is frequently used. In reproducing the same density using light and dark inks, the light ink reproduces an image with a higher glossiness. In view of this, when light ink is frequently used in the upper end portion in which the uneven shape of the surface of the recording medium is enhanced and which therefore has a glossiness lower than the lower end portion, the glossiness in the upper end portion can be improved, thereby reducing the difference in glossiness between the upper and lower ends.

A color separator 103 looks up the color separation LUT selected by the LUT selector 105 to convert the image data of the pixel of interest into recording data (S104). The color separator 103 color separates the RGB image data of the pixel of interest into CMYKLcLm data, and separates it into planes of large and small dots to be formed by ink droplets with different sizes (discharge amounts) for each ink color. That is, the recording head 201 discharges ink droplets with two, large and small sizes for each of six color inks. Thus, the RGB image data is converted into recording data of 12 planes in which C, M, Y, K, Lc, and Lm planes are combined with those ink droplet sizes.

Color Separator

Figure 14:
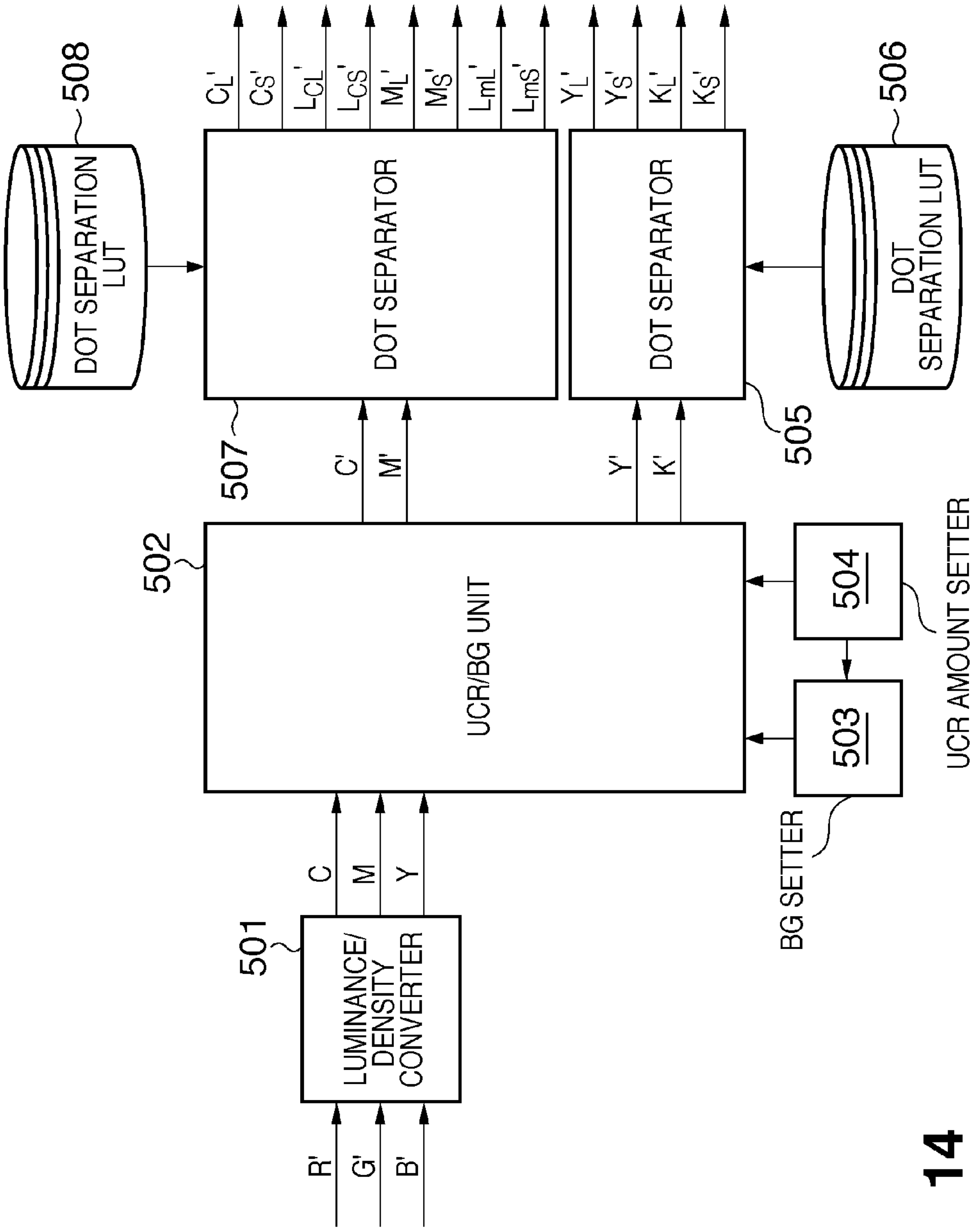
FIG. 14 is a block diagram for explaining the detailed configuration of a color separator.

The detailed configuration of the color separator 103 will be described with reference to a block diagram shown in FIG. 14.

No light inks are provided for two colors Y and K. Hence, a dot separator 505 looks up a dot separation LUT 506 (note that the dot separation LUT 506 is one of LUTs held in the color separation lookup table 104) to perform dot separation processing in the same way as in the first embodiment as:

$$Y_L' = f_{YL}(Y')$$

$$Y_S' = f_{YS}(Y')$$

$$K_L' = f_{KL}(K')$$

$$K_S' = f_{KS}(K') \quad (4)$$

where $f_{XL}$ and $f_{XS}$ are the dot separation functions for the X color (corresponding to the dot separation LUT 506), $X_L'$ is the recording data of a large dot in the X color after dot separation, and $X_S'$ is the recording data of a small dot in the X color after dot separation.

On the other hand, a dot separator 507 looks up a dot separation LUT 508 (note that the dot separation LUT 508 is one of LUTs held in the color separation lookup table 104) to perform dot separation processing including separation of dark and light colors of colors C and M and separation of large and small dots as:

$$C_L' = f_{CL}(C')$$

$C_S'=f_{CS}(C')$ $Lc_L'=f_{LcL}(C')$ $Lc_S'=f_{LcS}(C')$ $M_L'=f_{ML}(M')$ $M_S'=f_{MS}(M')$ $Lm_L'=f_{LmL}(M')$ $Lm_S'=f_{LcS}(M')$ (5)

where $f_{XL}$ and $f_{XS}$ are the dot separation functions for the X color (corresponding to the dot separation LUT 508), $X_L'$ is the recording data of a large dot in the X color after dot separation, and $X_S'$ is the recording data of a small dot in the X color after dot separation.

The dot separation functions $f_{XL}$ and $f_{XS}$ will be described next by taking only the configurations of the functions $f_{CL}$, $f_{CS}$, $f_{LcL}$, and $f_{LcS}$ for cyan and light cyan as an example. Functions for magenta and light magenta can be formed in the same way. Also, the configuration of a function describing a density (output value C') formed by only dark cyan or light cyan is the same as in the first embodiment. The configuration of a function describing a density region in which dark cyan and light cyan are used together will be described below.

Figure 15:
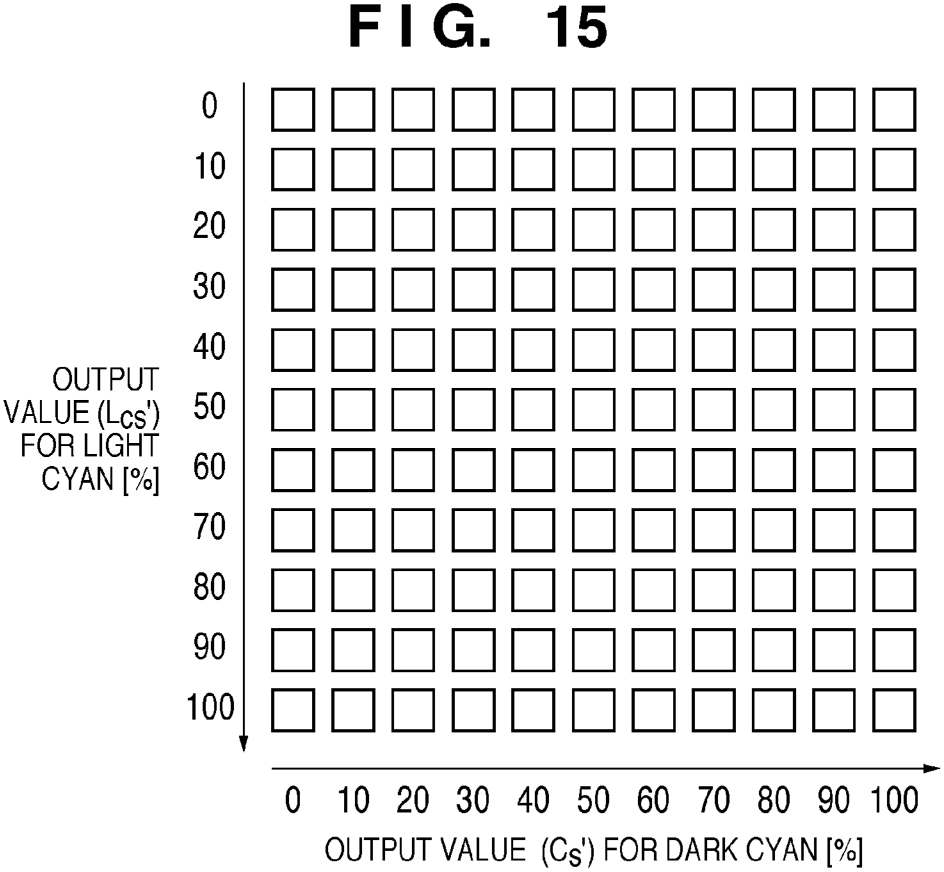
FIG. 15 is a chart for explaining an example of the configuration of a combined chart used to decide the amount of light ink used.

An example of the configuration of a combined chart used to decide the amount of light ink used will be described with reference to FIG. 15. The combined chart includes a plurality of patches formed by defining the output value $C_S'$ (0% to 100%) of a small dot in dark cyan on the abscissa, and the output value $Lc_S'$ (0% to 100%) of a small dot in light cyan on the ordinate. That is, each patch included in the combined chart is formed by a printer 200 using recording data obtained by combining a certain output value $C_L'$ of a small dot in dark cyan and a certain output value $Lc_S'$ of a small dot in light cyan. Note that the combined chart is formed using the number of passes and the recording rate, which are set in the upper end portion of the band.

Figure 11:
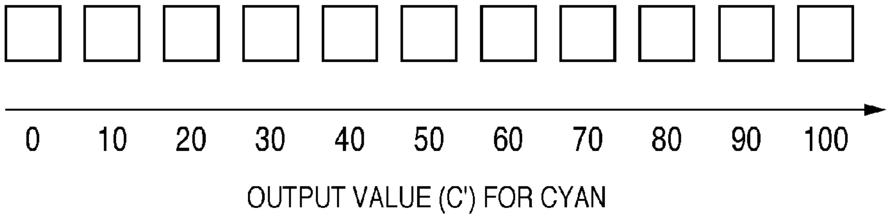
FIG. 11 is a chart for explaining an example of the configuration of a sample chart.

An example of the configuration of a sample chart used to decide the amount of light ink used is the same as in FIG. 11 of the first embodiment. That is, the sample chart includes a plurality of patches formed by defining the output value C' (0% to 100%) for cyan on the abscissa. That is, each patch included in the sample chart is formed by the printer 200 using recording data obtained by changing the output value C' for cyan. Note that the sample chart is formed using the number of passes, the recording rate, a small dot, and the ratio between light cyan and dark cyan (for example, 1:1), which are set in the lower end portion of the band.

Upon measuring the density (color) and glossiness of each patch in the combined chart, a plurality of patches which have nearly the same density measurement values but have different glossinesses are detected because dark cyan and light cyan have different glossinesses. In view of this, a patch with density and glossiness measurement values closest to those of each patch in the sample chart is selected from the combined chart. The output value $C_S'$ for dark cyan and the output value $Lc_S'$ for light cyan in the selected patch are decided as the output values for dark cyan and light cyan corresponding to the output value C' for cyan, which are used in the upper end portion.

For example, when measurement values corresponding to output values $C_S'$=20% and $Lc_S'$=30% in the combined chart are closest to those in a patch with an output value C'=50% in the sample chart, dot separation functions are set as:

$$\begin{aligned}
\text{For Lower End Portion: } f_{CS}(C') &= 0.5C' \\
f_{LcS}(C') &= 0.5C' \\
\text{For Upper End Portion: } f_{CS}(C') &= 20/50\times C' \\
&= 0.4C' \\
f_{LcS}(C') &= 30/50\times C' \\
&= 0.6C'
\end{aligned}$$

Dot separation functions in a density region in which dark cyan and light cyan are used together can be formed by repeating the above-mentioned procedure for each patch in the sample chart.

In this manner, if the pixel of interest is in the lower end portion (on the lower end side) of the recording region, a color separation table used to form dots by frequently using recording elements which discharge dark ink is selected. However, if the pixel of interest is in the upper end portion (on the upper end side) of the recording region, a color separation table used to form dots by frequently using recording elements which discharge light ink is selected. As a result, color separation is performed so as to use light ink more frequently on the upper end side of the band than on its lower end side, thereby making it possible to suppress the occurrence of band-shaped heterogeneity of glossiness.

Third Embodiment

Image processing in the third embodiment according to the present invention will be described below. The same reference numerals as in the first and second embodiments denote the same configurations in the third embodiment, and a detailed description thereof will not be given.

A method of reducing band-shaped heterogeneity of glossiness using clear ink will be described in the third embodiment.

[Recording Head]

Figure 16:
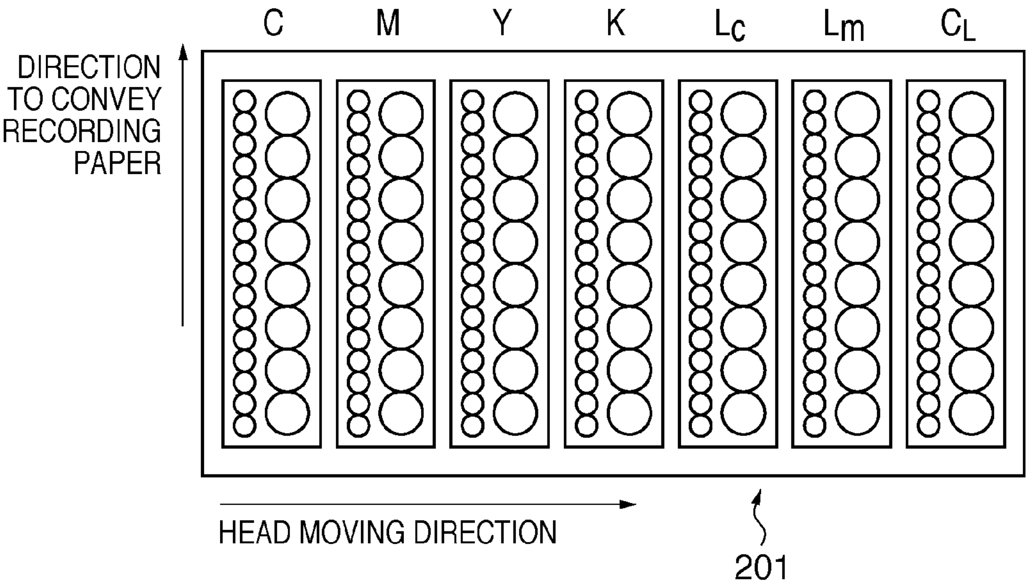
FIG. 16 is a view for explaining the arrangement of a recording head in the third embodiment.

An example of the configuration of a recording head 201 in the third embodiment will be described with reference to FIG. 16. The recording head 201 in the third embodiment discharges pigment inks of seven colors: cyan C, magenta M, yellow Y, black K, light cyan Lc, light magenta Lm, and clear $C_L$. Also, the recording head 201 includes nozzles with different ink droplet sizes (discharge amounts) for each color, and discharges ink droplets which form large dots and those which form small dots, as in the first embodiment. However, the recording head 201 may discharge ink droplets which form only small dots or large dots.

[Operation of Image Processing Apparatus]

The operation of an image processing apparatus in the third embodiment is the same as in the first embodiment except for steps S103 and S104 in FIG. 7. Based on the determination result obtained by a pixel position determiner 106, a LUT selector 105 selects one of color separation LUTs held in a color separation lookup table 104 (S103).

Figure 17:
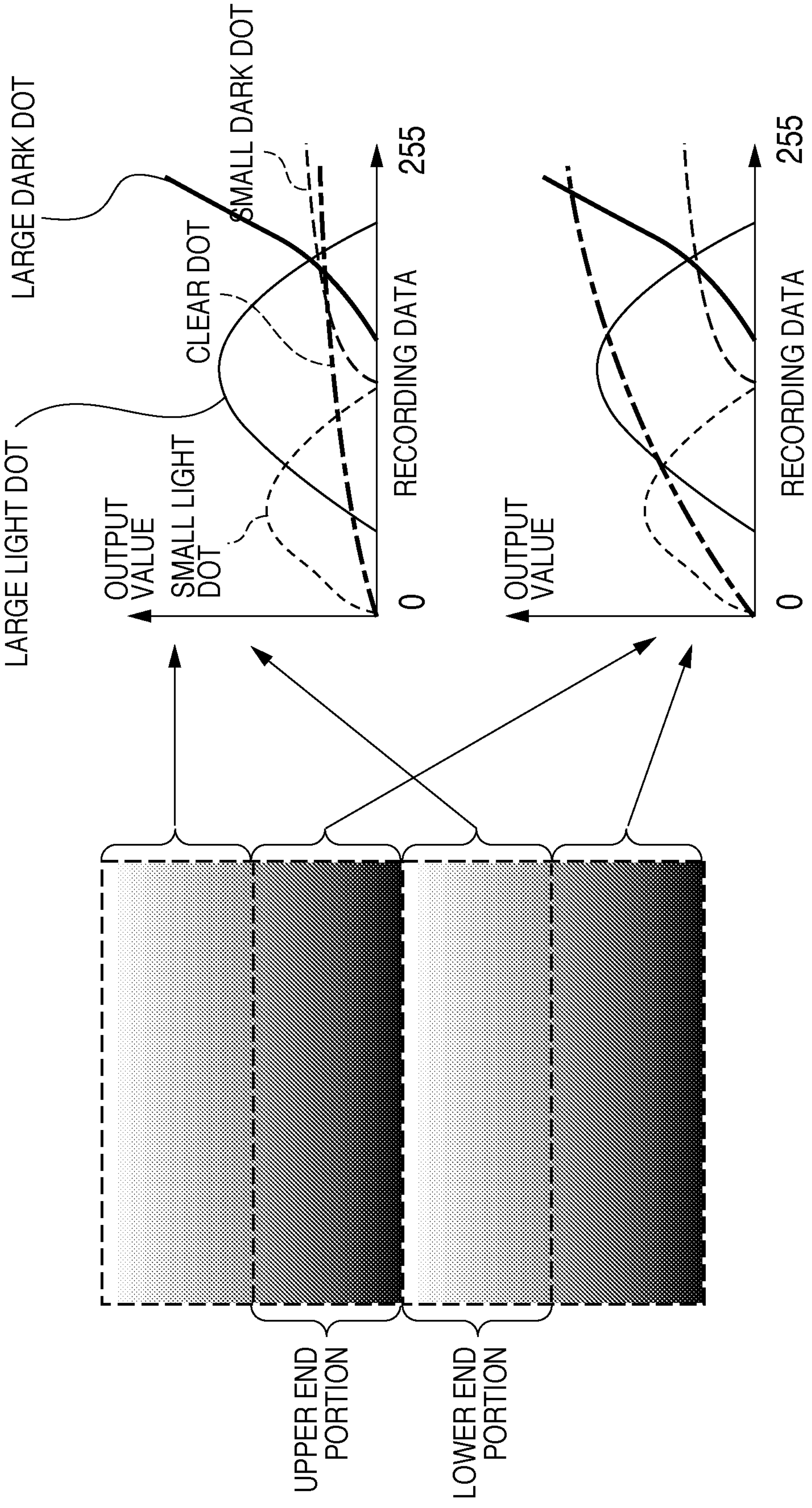
FIG. 17 is a view for explaining a method of selecting a color separation LUT.

A method of selecting a color separation LUT will be described with reference to FIG. 17. If the pixel of interest is in the upper end portion of the band, the LUT selector 105 selects a color separation LUT according to which dots of clear ink (to be referred to as clear dots hereinafter) are used more frequently than if the pixel of interest is in the lower portion of the band. When clear ink is frequently used in the upper end portion in which the uneven shape of the surface of the recording medium is enhanced and which therefore has a glossiness lower than the lower end portion, the glossiness in the upper end portion can be improved, thereby reducing the difference in glossiness between the upper and lower ends.

A color separator 103 looks up the color separation LUT selected by the LUT selector 105 to convert the image data of the pixel of interest into recording data (S104). The color separator 103 color separates the RGB image data of the pixel of interest into CMYKLcLm$C_L$ data, and separates it into planes of large and small dots to be formed by ink droplets with different sizes (discharge amounts) for each ink color. That is, the recording head 201 discharges ink droplets with two, large and small sizes for each of seven color inks. Thus, the RGB image data is converted into recording data of 14 planes in which C, M, Y, K, Lc, Lm, and $C_L$ planes are combined with those ink droplet sizes.

Color Separator

Figure 18:
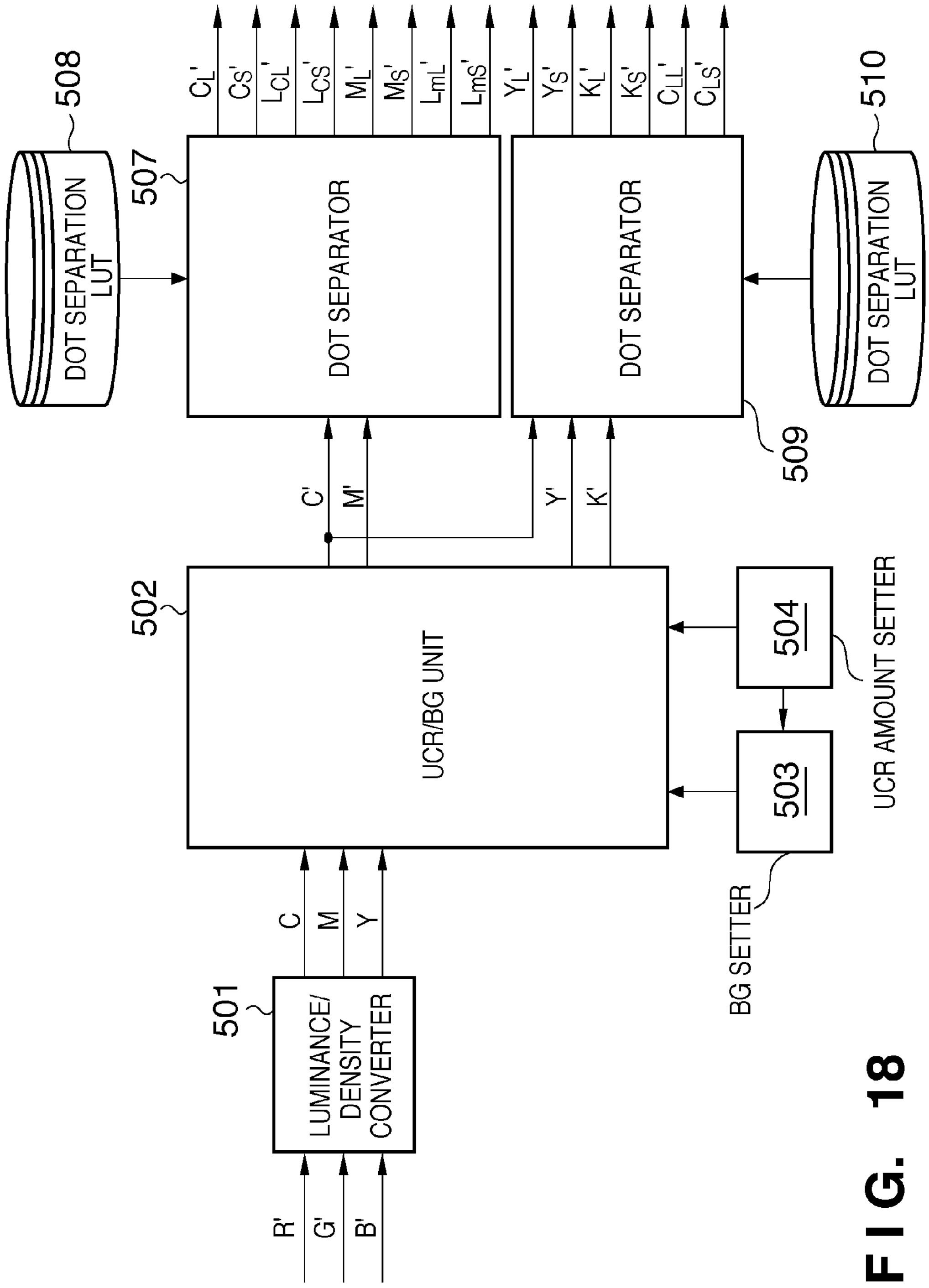
FIG. 18 is a block diagram for explaining the detailed configuration of a color separator.

The detailed configuration of the color separator 103 will be described with reference to a block diagram shown in FIG. 18. Configurations other than a dot separator 509 and a dot separation LUT 510 are the same as in the first and second embodiments. Hence, the same reference numerals as in the first and second embodiments denote the same configurations in the third embodiment, and a detailed description thereof will not be given.

The dot separator 509 looks up the dot separation LUT 510 (note that the dot separation LUT 510 is one of LUTs held in the color separation lookup table 104) to perform dot separation processing as:

$$Y_L'=f_{YL}(Y')$$

$$Y_S'=f_{YS}(Y')$$

$$K_L'=f_{KL}(K')$$

$$K_S'=f_{KS}(K')$$

$$C_{LL}'=f_{CLL}(C')$$

$$C_{LS}'=f_{CLS}(C') \quad (6)$$

where $f_{XL}$ and $f_{XS}$ are the dot separation functions for the X color (corresponding to the dot separation LUT 506), $X_L'$ is the recording data of a large dot in the X color after dot separation, and $X_S'$ is the recording data of a small dot in the X color after dot separation.

The dot separation functions $f_{XL}$ and $f_{XS}$ will be described next by taking only the configurations of the functions $f_{CLL}$ and $f_{CLS}$ for clear color as an example. The configurations of functions for other colors are the same as in the first and second embodiments.

Figure 19:
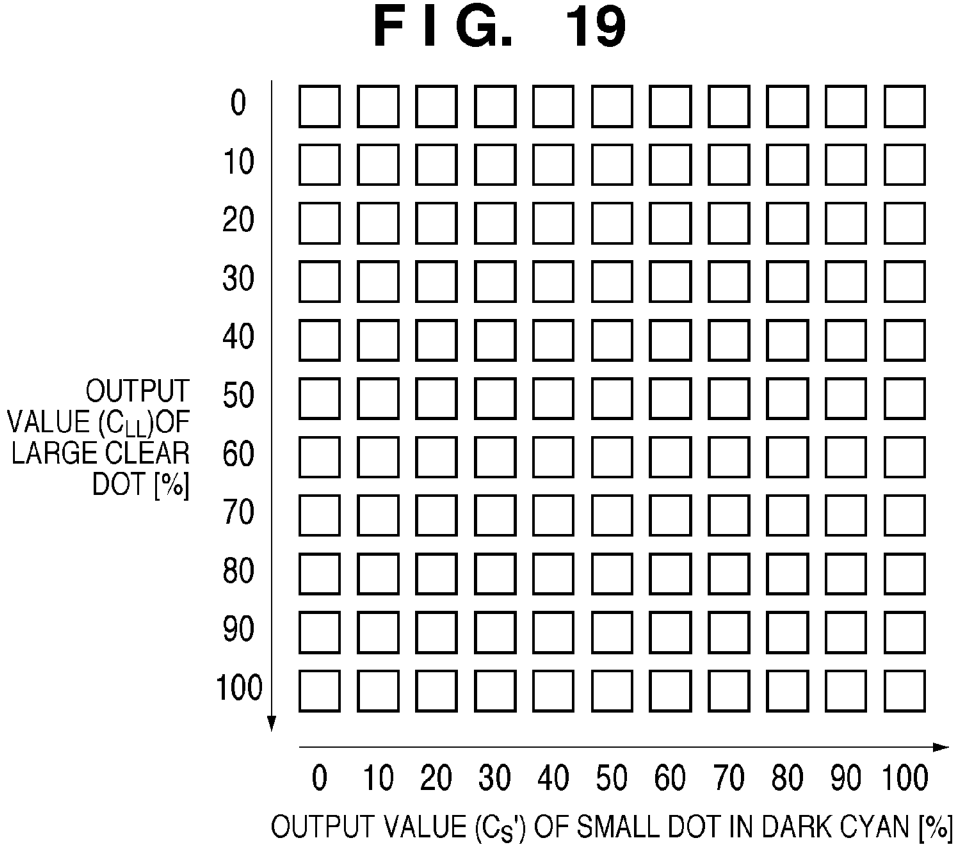
FIG. 19 is a chart for explaining an example of the configuration of a combined chart used to decide the amount of clear ink used.

An example of the configuration of a combined chart used to decide the amount of clear ink used will be described with reference to FIG. 19. The combined chart includes a plurality of patches formed by defining the output value $C_S'$ (0% to 100%) of a small dot in dark cyan on the abscissa, and the output value $C_{LL}'$ (0% to 100%) of a large clear dot on the ordinate. That is, each patch included in the combined chart is formed by a printer 200 using recording data obtained by combining a certain output value $C_S'$ of a small dot in dark cyan and a certain output value $C_{LL}'$ of a large clear dot. Note that the combined chart is formed using the number of passes and the recording rate, which are set in the upper end portion of the band.

An example of the configuration of a sample chart used to decide the amount of clear ink used is the same as in FIG. 11 of the first embodiment. That is, the sample chart includes a plurality of patches formed by defining the output value C' (0% to 100%) for cyan on the abscissa. That is, each patch included in the sample chart is formed by the printer 200 using recording data obtained by changing the output value C' for cyan. Note that the sample chart is formed using the number of passes, the recording rate, a small dot, the ratio between light cyan and dark cyan (for example, 1:1), and an output value $C_{LS}$=0.1 C' of a clear dot, which are set in the lower end portion of the band.

Upon measuring the density (color) and glossiness of each patch in the combined chart, a plurality of patches which have nearly the same density measurement values but have different glossinesses are detected. In view of this, a patch with density and glossiness measurement values closest to those of each patch in the sample chart is selected from the combined chart. The output value $C_{LL}'$ for clear color in the selected patch is decided as the output value for a large clear dot corresponding to the output value C' for cyan, which is used in the upper end portion.

For example, when measurement values corresponding to output values $C_{LL}'$=30% and $C_S'$=45% in the combined chart are closest to those in a patch with an output value C'=50% in the sample chart, dot separation functions are set as:

$$\begin{aligned}
\text{For Lower End Portion: } f_{CLL}(C') &= 0\\
f_{CLS}(C') &= 0.1C'\\
\text{For Upper End Portion: } f_{CLL}(C') &= 30/50\times C'\\
&= 0.6C'\\
f_{CLS}(C') &= 0.1C'
\end{aligned}$$

Figure 20A:
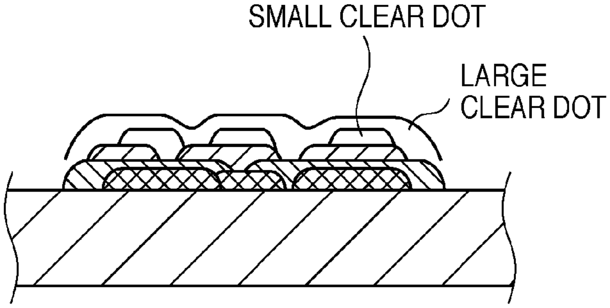
FIGS. 20A and 20B are schematic views for explaining recording of clear ink in the upper and lower end portions.
Figure 20B:
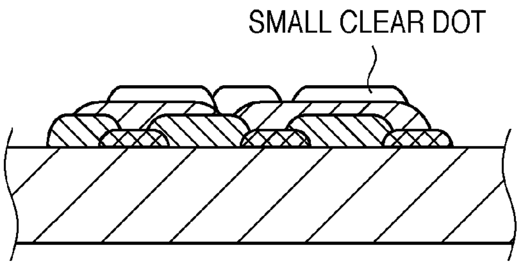

Recording of clear ink in the upper and lower end portions will be described with reference to schematic views shown in FIGS. 20A and 20B. Large and small clear dots are recorded in the upper end portion in which the uneven shape of the surface of the recording medium is enhanced (FIG. 20A). On the other hand, only small clear dots are recorded in the lower end portion in which the uneven shape is lessened (FIG. 20B). Thus, clear ink is used more frequently in the upper end portion of the band than in its lower end portion, thereby making it possible to reduce the difference in glossiness between the upper and lower ends.

Figure 21:
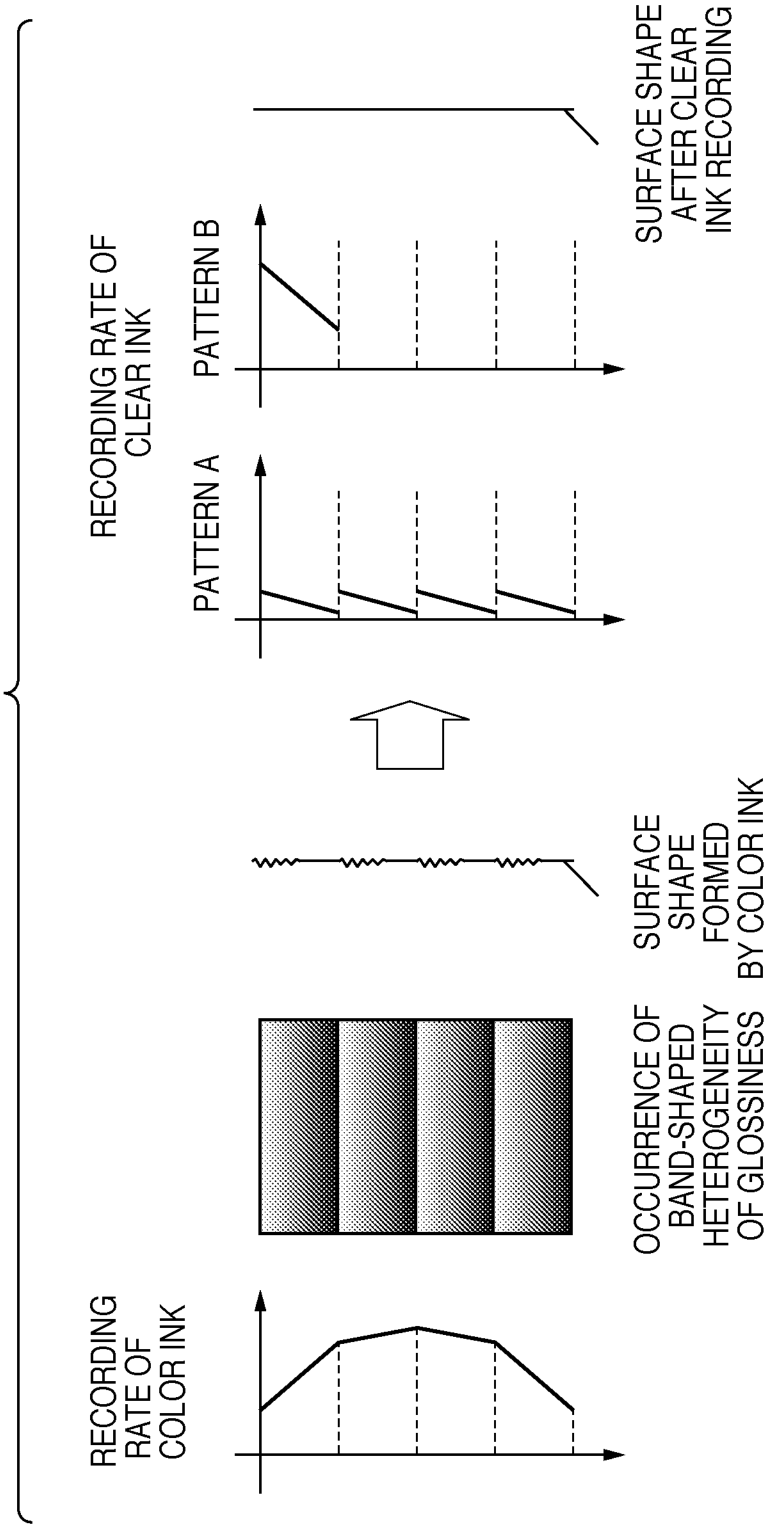
FIG. 21 is a view for explaining the relationships between the recording rate of color ink, the occurrence of band-shaped heterogeneity of glossiness, and the recording rate of clear ink.

The relationships between the recording rate of color ink, the occurrence of band-shaped heterogeneity of glossiness, and the recording rate of clear ink will be described with reference to FIG. 21. When clear ink is recorded in, for example, pattern A or B to compensate for band-shaped heterogeneity of glossiness, that has occurred upon recording only color ink, the surface shape after the clear ink recording can be flattened, thereby reducing the band-shaped heterogeneity of glossiness. Setting the recording rate of clear ink excessively high often poses problems such as the end dot deflection due to the influence of airflow and the difference in frequency of use among the individual nozzles. An appropriate recording rate can be set within the range in which no such problems are posed.

In this manner, if the pixel of interest is in the lower end portion (on the lower end side) of the recording region, a color separation table according to which the amount of clear ink used is kept small is selected. However, if the pixel of interest is in the upper end portion (on the upper end side) of the recording region, a color separation table according to which the amount of clear ink used is larger than in the color separation table selected on the lower end side is selected. As a result, color separation is performed so as to use a larger amount of clear ink on the upper end side of the band than on its lower end side, thereby making it possible to suppress the occurrence of band-shaped heterogeneity of glossiness.

Modification of Embodiments

By increasing the numbers of graduations on the abscissa and ordinate in a combined chart as mentioned above, a patch with measurement values closer to those of a patch in a sample chart can be extracted, thereby improving the accuracy of density and glossiness reproduction by dot separation. The numbers of graduations on the abscissa and ordinate can be appropriately set in accordance with, for example, the required reproduction accuracy and the processing load.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-028206, filed Feb. 10, 2010, which is hereby incorporated by reference herein in its entirety.

What is claimed is:

1. An image processing apparatus for generating image data for use in image formation by multi-pass recording, comprising:

a determiner, configured to determine a position of a pixel of interest to be color separated relative to a recording region corresponding to a conveyance distance of a recording medium in one pass of the multi-pass recording;

a selector, configured to select a color separation table corresponding to a result of the determination; and a color separator, configured to color separate image data of the pixel of interest using the selected color separation table, wherein the selector selects a color separation table, according to which an amount of clear ink used is kept small, if the pixel of interest is included in a lower end side of the recording region, and selects a color separation table, according to which the amount of the clear ink used is larger than in the color separation table selected on the lower end side, if the pixel of interest is included in an upper end side of the recording region.

2. The apparatus according to claim 1, further comprising:

a halftone processor, configured to perform halftone processing of the image data color separated by said color separator; and an output section, configured to output the image data, on which the halftone processing has been performed, to an image forming apparatus comprising a recording head including recording elements which discharge color ink and recording elements which discharge the clear ink.

3. A method of generating image data for use in image formation by multi-pass recording, comprising:

using a processor to perform the steps of:

determining a position of a pixel of interest to be color separated relative to a recording region corresponding to a conveyance distance of a recording medium in one pass of the multi-pass recording;

selecting a color separation table corresponding to a result of the determination; and color separating image data of the pixel of interest using the selected color separation table, wherein, in the selecting step, a color separation table according to which an amount of clear ink used is kept small is selected, if the pixel of interest is included in a lower end side of the recording region, and a color separation table according to which the amount of the clear ink used is larger than in the color separation table selected on the lower end side is selected, if the pixel of interest is included in an upper end side of the recording region.

4. A non-transitory computer readable medium storing a computer-executable program for causing a computer to perform a method of generating image data for use in image formation by multi-pass recording, the method comprising the steps of:

determining a position of a pixel of interest to be color separated relative to a recording region corresponding to a conveyance distance of a recording medium in one pass of the multi-pass recording;

selecting a color separation table corresponding to a result of the determination; and color separating image data of the pixel of interest using the selected color separation table, wherein, in the selecting step, a color separation table according to which an amount of clear ink used is kept small is selected, if the pixel of interest is included in a lower end side of the recording region, and a color separation table according to which the amount of the clear ink used is larger than in the color separation table selected on the lower end side is selected, if the pixel of interest is included in an upper end side of the recording region.

5. An image processing apparatus for generating image data for use in image formation by multi-pass recording, comprising:

a determiner, configured to determine a position of a pixel of interest to be color separated relative to a recording region corresponding to a conveyance distance of a recording medium in one pass of the multi-pass recording;

a selector, configured to select a color separation table corresponding to a result of the determination; and a color separator, configured to color separate image data of the pixel of interest using the selected color separation table, wherein the selector selects a color separation table, according to which an amount of clear ink used is a first amount, if the pixel of interest is included in a lower end side of the recording region, and selects a color separation table, according to which the amount of the clear ink used is larger than in the color separation table selected on the lower end side, if the pixel of interest is included in an upper end side of the recording region.

6. A method of generating image data for use in image formation by multi-pass recording, comprising:

using a processor to perform the steps of:

determining a position of a pixel of interest to be color separated relative to a recording region corresponding to a conveyance distance of a recording medium in one pass of the multi-pass recording;

selecting a color separation table corresponding to a result of the determination; and color separating image data of the pixel of interest using the selected color separation table, wherein, in the selecting step, a color separation table according to which an amount of clear ink used is a first amount, if the pixel of interest is included in a lower end side of the recording region, and a color separation table according to which the amount of the clear ink used is larger than in the color separation table selected on the lower end side is selected, if the pixel of interest is included in an upper end side of the recording region.

7. A non-transitory computer readable medium storing a computer-executable program for causing a computer to perform a method of generating image data for use in image formation by multi-pass recording, the method comprising the steps of:

determining a position of a pixel of interest to be color separated relative to a recording region corresponding to a conveyance distance of a recording medium in one pass of the multi-pass recording;

selecting a color separation table corresponding to a result of the determination; and color separating image data of the pixel of interest using the selected color separation table, wherein, in the selecting step, a color separation table according to which an amount of clear ink used is a first amount is selected, if the pixel of interest is included in a lower end side of the recording region, and a color separation table according to which the amount of the clear ink used is larger than in the color separation table selected on the lower end side is selected, if the pixel of interest is included in an upper end side of the recording region.

Figure 1:
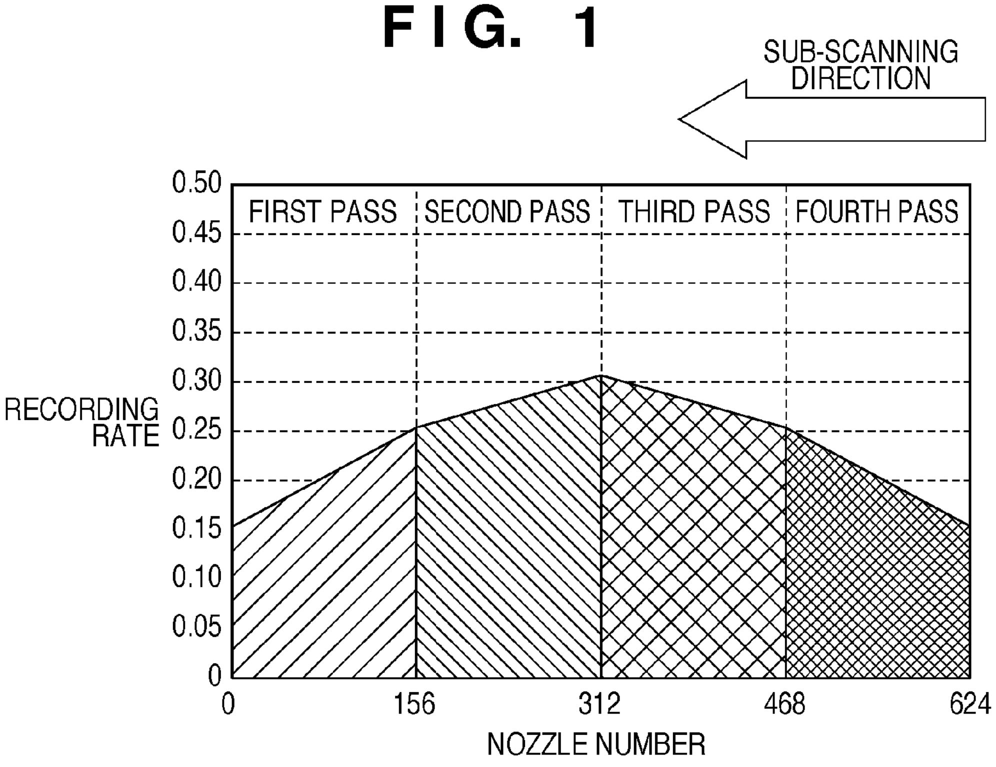
FIG. 1 is a graph illustrating an example of the relationship between nozzles and the recording rate in four-pass recording.
Figure 2:
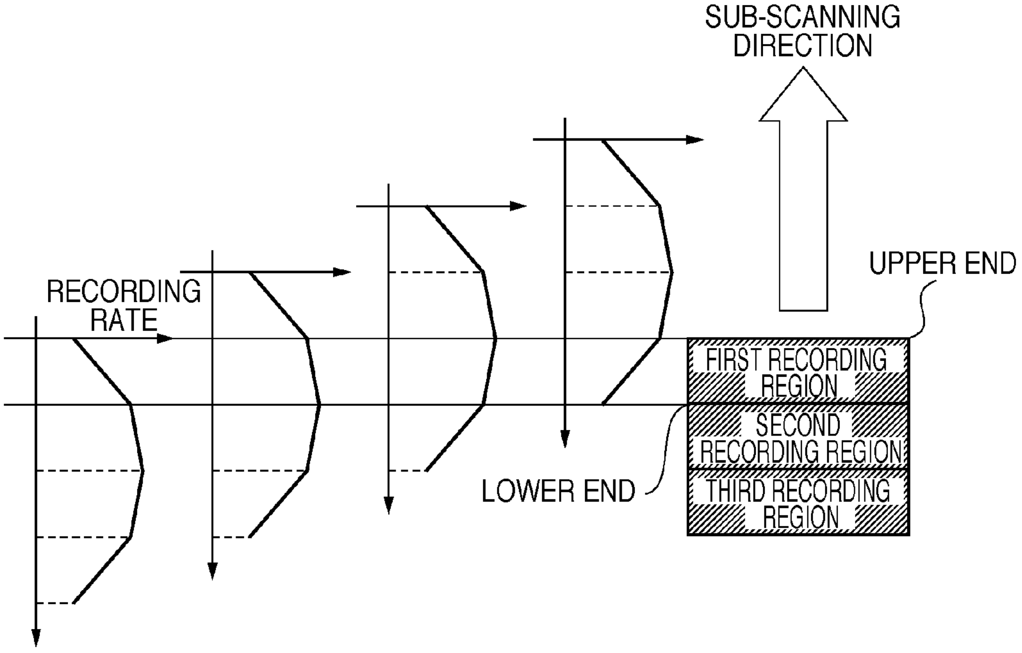
FIG. 2 is a graph for explaining band-shaped heterogeneity of glossiness.
Figure 3A:
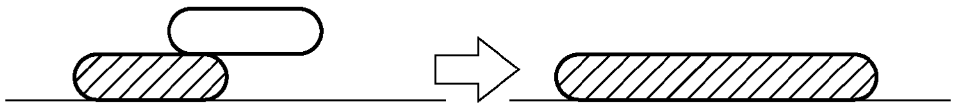
FIGS. 3A and 3B are schematic views for explaining the cause of the difference in glossiness between the upper and lower ends of a recording region.
Figure 3B:
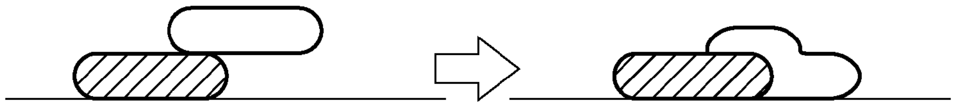
Figure 4B:
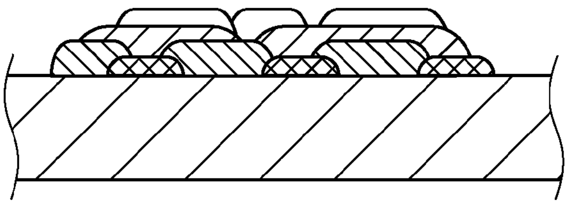

8. The image processing apparatus according to claim 2, wherein the image forming apparatus changes a recording rate in each pass in accordance with positions of the recording elements which discharge the color ink (FIGS. 1 and 4).

9. The image processing apparatus according to claim 8, wherein the image forming apparatus forms dots using the recording elements which discharge color ink droplets having small size and large size.

10. The image processing apparatus according to claim 5, further comprising:

a halftone processor, configured to perform halftone processing of the image data color separated by the color separator; and an output section, configured to output the image data, on which the halftone processing has been performed, to an image forming apparatus comprising a recording head including recording elements which discharge color ink and recording elements which discharge the clear ink.

11. The image processing apparatus according to claim 10, wherein the image forming apparatus changes a recording rate in each pass in accordance with positions of the recording elements which discharge the color ink.

12. The image processing apparatus according to claim 11, wherein the image forming apparatus forms dots using the recording elements which discharge color ink droplets having small size and large size.

* * * * *